United States Patent
Hartel et al.

(10) Patent No.: US 6,945,756 B2
(45) Date of Patent: Sep. 20, 2005

(54) MOTOR-PUMP ASSEMBLY, IN PARTICULAR AN ANTI-LOCK BRAKING SYSTEM FOR A MOTOR VEHICLE

(75) Inventors: Gerd Hartel, Kuemach (DE); Matthias Tupy, Gerbrunn (DE)

(73) Assignee: Siemens Aktiengesellschaft, Munich (DE)

( * ) Notice: Subject to any disclaimer, the term of this patent is extended or adjusted under 35 U.S.C. 154(b) by 103 days.

(21) Appl. No.: 10/621,143

(22) Filed: Jul. 16, 2003

(65) Prior Publication Data

US 2004/0075352 A1 Apr. 22, 2004

Related U.S. Application Data

(63) Continuation of application No. PCT/DE01/00204, filed on Jan. 18, 2001.

(51) Int. Cl.$^7$ .............................................. F04B 17/03
(52) U.S. Cl. .................... 417/360; 417/410.1; 417/415; 310/71
(58) Field of Search .............................. 417/410.1, 415, 417/360; 310/71, 91

(56) References Cited

U.S. PATENT DOCUMENTS

| | | | | |
|---|---|---|---|---|
| 1,244,533 A | | 10/1917 | Morse | 464/104 |
| 1,488,497 A | | 4/1924 | Higgins | 464/105 |
| 4,049,364 A | | 9/1977 | Ross et al. | 417/360 |
| 4,941,861 A | | 7/1990 | Painter | 464/102 |
| 5,022,645 A | | 6/1991 | Green | 464/104 |
| 5,895,207 A | | 4/1999 | Burgdorf et al. | 417/410.1 |
| 5,957,548 A | * | 9/1999 | Wetzel | 303/119.3 |
| 6,011,341 A | | 1/2000 | Toya et al. | 310/239 |
| 6,163,093 A | * | 12/2000 | Shimizu et al. | 310/42 |
| 6,179,580 B1 | * | 1/2001 | Huber et al. | 417/360 |
| 6,241,489 B1 | | 6/2001 | Lewin et al. | 417/410.1 |
| 6,550,873 B1 | * | 4/2003 | Hengler et al. | 303/119.3 |

FOREIGN PATENT DOCUMENTS

| | | | | |
|---|---|---|---|---|
| DE | 4235962 A1 | 5/1994 | | H02K/5/14 |
| DE | 19756729 A1 | 12/1997 | | H02K/11/00 |
| EP | 0 645 875 B1 | 4/1995 | | H02K/23/66 |
| EP | 1038745 A2 | 2/2000 | | B60T/8/40 |
| EP | 0 645 875 B2 | 1/2001 | | H02K/23/66 |
| EP | 0 695 875 B1 | 6/2001 | | F15B/11/00 |
| EP | 0695875 B1 | 6/2001 | | F15B/11/00 |
| GB | 771595 | 4/1957 | | |
| JP | 05288143 | 11/1993 | | F04B/1/04 |
| JP | 09098559 | 4/1997 | | H02K/23/00 |
| JP | 2000127934 | 5/2000 | | B60T/8/34 |
| WO | WO95/08209 | 9/1994 | | H02K/5/14 |
| WO | WO94/27045 | 11/1994 | | F04B/17/00 |
| WO | WO96/28327 | 9/1996 | | B60T/8/36 |
| WO | WO/98/16988 | 10/1996 | | H02K/5/22 |
| WO | WO98/16986 | 4/1998 | | H02K/5/10 |
| WO | WO98/56630 | 12/1998 | | B60T/8/36 |
| WO | WO01/26945 | 4/2001 | | B60T/8/36 |
| WO | WO02/057125 | 7/2002 | | B60T/8/36 |

* cited by examiner

Primary Examiner—Charles G. Freay
(74) Attorney, Agent, or Firm—Baker Botts LLP

(57) ABSTRACT

Despite an axial sandwich structure of a motor housing (1), pump housing (2) and electronics housing (3), in a simple production and installation process a plug-in connection comprising power supply and control conductors (4.1;4.2) that is devoid of distortion can be produced between a brush plate (6) in the motor housing (1) and the electronics housing (3) passing though the pump housing (2). To achieve this, the power supply or control conductors (4.1;4.2) are configured as a fixed plug-in connector, with their ends on the motor housing side fixed into the brush plate (5) in the form of a pre-assembled component unit, in particular as a one-piece, bent part of a punched grid (4) that has been injected into said brush plate. Their free plug-in ends on the other hand, which are surrounded by an elastic insulating jacket, can be elastically bent away in a transversal direction to their axial direction of insertion in order to compensate tolerances.

15 Claims, 3 Drawing Sheets

MOTOR-PUMP ASSEMBLY, IN PARTICULAR AN ANTI-LOCK BRAKING SYSTEM FOR A MOTOR VEHICLE

CROSS REFERENCE TO RELATED APPLICATION

This application is a continuation of copending International Application No. PCT/DE01/00204 filed Jan. 18, 2001, which designates the United States.

TECHNICAL FIELD OF THE INVENTION

The invention relates to a motor-pump assembly, in particular an anti-lock braking system for a motor vehicle.

BACKGROUND OF THE INVENTION

An anti-lock braking system for a motor vehicle is disclosed in EP 0 645 875 B1; the power supply and control conductors which are electrically connected on the motor housing side to a brush plate pass through the faces, lying in front of one another, of motor housing and pump housing, and of pump housing and electronics housing, and are laid on the inside of the housings; according to one design, the power supply and control conductors are arranged, in particular injected, in the motor housing inside axial spacers between the faces of stator exciting magnets, it being possible for the spacers, in order to simplify assembly for the purposes of providing an automatic plug-in contact between the injected power supply and control conductors and the terminal of the electronic housing, to be extended through the pump housing.

SUMMARY OF THE INVENTION

According to the object of the present invention, contacting difficulties between the power supply and control conductors on the one hand and the terminal, e.g. a printed-circuit board, of the electronics housing should, despite an advantageous further simplified production and installation process for a mass-produced article, with certainty be avoidable in the axial sandwich structure of motor housing with pump housing and pump housing with electronics housing.

This object can be successfully achieved by a motor-pump assembly comprising in an axial sandwich arrangement in series a motor housing, a pump housing and an electronics housing, at least two plug-in type power supply or control conductors leading, electrically insulated from one another, from the motor housing through the pump housing to the electronics housing, wherein the plug-in type power supply or control conductors are firmly fixed on the motor housing side in a socket and in other respects freely movable in a transversal direction to the direction of their longitudinal extension at least for the purposes of compensating tolerances, and wherein the plug-in type power supply or control conductors are one-piece bent bending-die-punched parts of a stamped grid held by the socket, and a shared elastic insulating jacket for at least two power supply or control conductors, wherein the elastic insulating jacket is arranged to be slipped as a pre-fabricated part on to the plug-in type power supply and control conductors, and the slipped-on insulating jacket is fixed in its ultimate operating position by latching with latches of the plug-in type power supply and control conductors.

The object can also be achieved by a motor-pump assembly, in particular an anti-lock braking system for a motor vehicle, comprising in an axial sandwich arrangement in series a motor housing, a pump housing and an electronics housing, wherein at least two plug-in type power supply or control conductors lead, electrically insulated from one another, from the motor housing through the pump housing to the electronics housing; the plug-in type power supply or control conductors are firmly fixed on the motor housing side in a socket, in particular in a brush plate, and in other respects freely movable in a transversal direction to the direction of their longitudinal extension at least for the purposes of compensating tolerances; the plug-in type power supply or control conductors are parts, in particular one-piece, bent bending-die-punched parts of a stamped grid held by the socket, in particular the brush plate; a shared elastic insulating jacket is provided for at least two power supply or control conductors, preferably running parallel to one another, the elastic insulating jacket can be slipped as a pre-fabricated part on to the plug-in type power supply and control conductors, in particular from their free ends facing toward the electronics housing, and the slipped-on insulating jacket is fixed in its ultimate operating position by latching with latches of the plug-in type power supply and control conductors.

The object can furthermore be achieved by a motor-pump assembly, in particular an anti-lock braking system for a motor vehicle, comprising in an axial sandwich arrangement in series a motor housing, a pump housing and an electronics housing, wherein at least two plug-in type power supply or control conductors lead, electrically insulated from one another, from the motor housing to the electronics housing, the plug-in type power supply or control conductors are firmly fixed on the motor housing side in a socket, in particular in a brush plate, and in other respects freely movable in a transversal direction to the direction of their longitudinal extension at least for the purposes of compensating tolerances, the plug-in type power supply or control conductors are parts, in particular one-piece, bent bending-die-punched parts of a stamped grid held by the socket, in particular the brush plate, a shared elastic insulating jacket for at least two power supply or control conductors is provided, preferably running parallel to one another, the elastic insulating jacket can be slipped as a pre-fabricated part on to the plug-in type power supply and control conductors, in particular from their free ends facing toward the electronics housing, and the slipped-on insulating jacket is fixed in its ultimate operating position by latching to the plug-in type power supply and control conductors.

The plug-in type power supply or control conductors may be fashioned as flat-connector tabs and can be elastically bent away in a transversal direction to the direction of their longitudinal extension in order to compensate tolerances. The plug-in type power supply or control conductors can, with their free ends facing away from the motor housing, be contacted, preferably plug-contacted, with an electronic unit in the electronics housing, in particular a printed-circuit board. The plug-in type power supply or control conductors embedded in the insulating jacket may be laid through the faces, lying in front of one another, of motor housing/pump housing and pump housing/electronics housing and on the inside of each housing. The plug-in type power supply and control conductors embedded in the insulating jacket may be, in relation to the pump housing, laid on the outside of the housing. The power supply or control conductors can, when the motor housing pre-equipped with the brush plate is assembled with the pump housing and with the electronics housing, be forcibly contacted with the terminal of said electronics housing.

By fixing the plug-in type power supply and control conductors, preferably projecting tab-like perpendicular to the brush plate, in the socket on the motor side, in particular on the brush plate, said power supply and control conductors can be produced with this component as a pre-assembled unit and contacted when the housing is assembled, it being possible for mechanical distortion loadings through mutual displacement tolerances of the housings to be assembled and sealed from one another and from the power supply and control conductors to be avoided as a result of the mobility in other respects of the power supply and control conductors in interaction with the elastic insulation.

In a further simplification of the production and installation process, the power supply and control conductors are a one-piece component of a punched grid held by the socket, in particular of a punched grid injected in the brush plate, which serves for connecting additional components, e.g. interference suppressors and in particular brushes feeding the rotor winding.

BRIEF DESCRIPTION OF THE DRAWINGS

The invention and advantageous embodiments of the invention are described in detail below with the aid of diagrammatic exemplary embodiments in the drawings, in which.

DETAILED DESCRIPTION OF THE PREFERRED EMBODIMENTS

Figure 1:
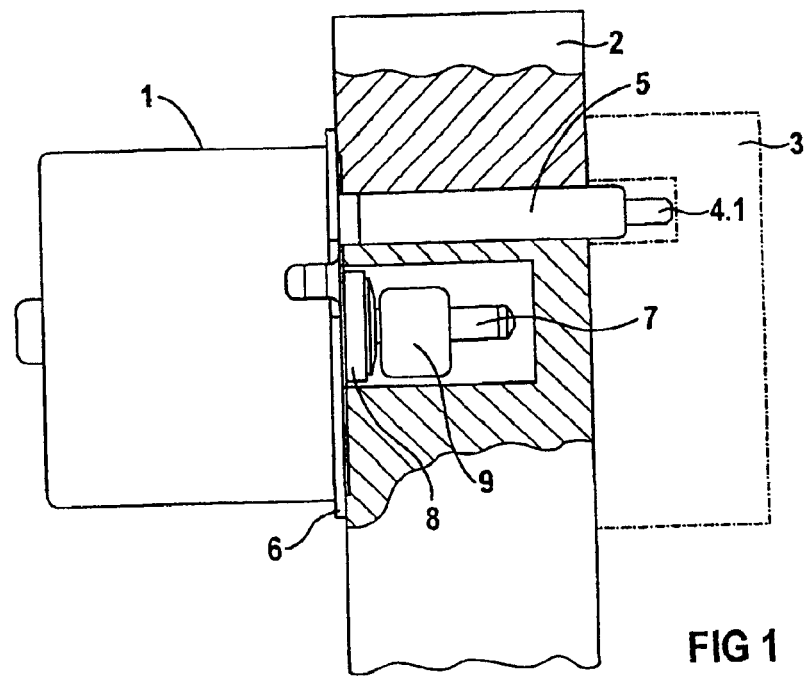
FIG. 1 shows in an axial part sectional drawing a fully assembled motor-pump assembly.

FIG. 1 shows in an axial part sectional drawing a complete motor-pump assembly which can be used e.g. for an anti-lock braking system for a motor vehicle. One face of a pump-housing 2 of a high-pressure pump for a brake hydraulic fluid is flange-mounted, in sealing fashion, to a cup-shaped motor housing 1 of a commutator electric motor; an electronics housing 3 is attached to the other face of the pump housing 2, said electronics housing accommodating a terminal—not shown separately here but known from EP 0 695 875 B1—in particular a power supply and control unit, e.g. in the form of a printed-circuit board for the commutator electric motor.

In the region of the side of the cup rim, the motor housing 1 is terminated by a brush plate 6 from which one end of the rotor shaft 7 supported in a bearing 8 of the commutator electric motor projects, said shaft end accommodating an eccentric 9, by which, in a way not shown here in detail and likewise known e.g. from EP 0 645 875 B1, pump rams of the high-pressure pump are driven.

Figure 2:
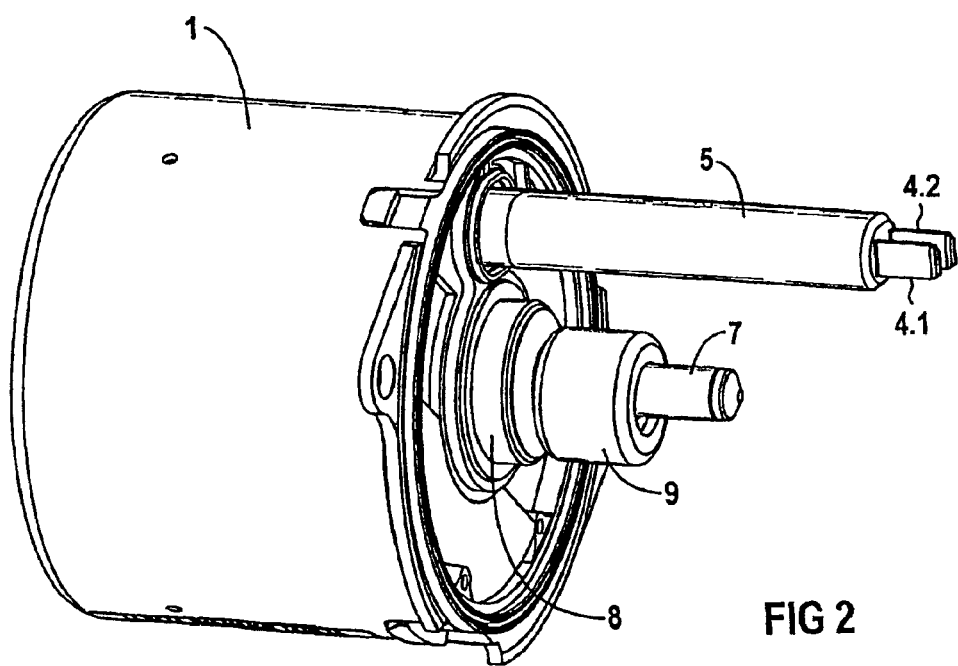
FIG. 2 shows as a pre-assembled unit the motor housing with an output to the pump housing and with a power supply and control conductor connection to the electronics housing.

Tab-shaped power supply and control conductors 4.1;4.2 which—as can be seen from FIG. 2—essentially run perpendicular to the plane of the brush plate 6 inside and through the pump housing 2 and can thereby be particularly easily protected against external influences serve to provide an electric connection between the electronics housing 3 and the electric components, in particular brushes 10 held by the brush plate 5.

Figure 6:
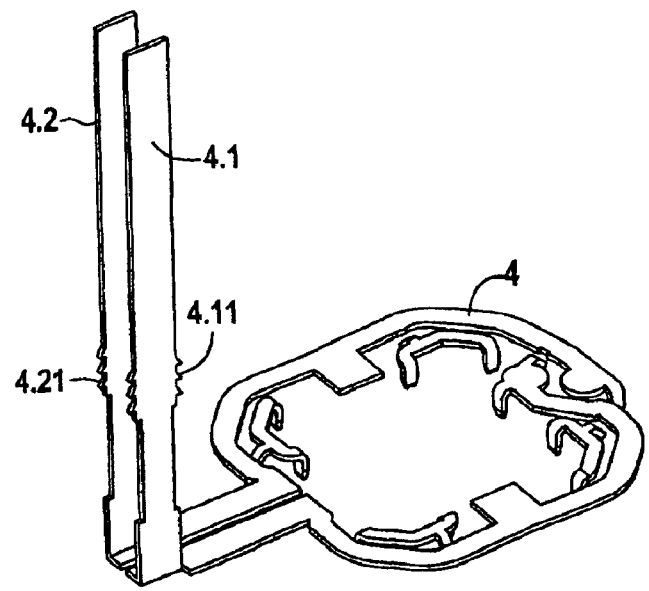
FIG. 6 shows in perspective view a punched grid to be injected into the brush plate with one-piece, flat-tab-like bent power supply and control conductors.

As can be seen from FIG. 3 to FIG. 6, the tab-shaped power supply and control conductors 4.1;4.2 are fixed as a pre-assembled component unit with their ends on the motor housing side in the brush plate, in particular in the form of a single piece with a punched grid 4 injected into the brush plate 6, said punched grid serving in a way known per se to connect the structural elements held by the brush plate 5 and from which punched grid the tab-shaped power supply and control conductors 4.1;4.2, also punched initially in the plane of the punched grid 4, are bent away, as can be seen from FIG. 6.

Figure 3:
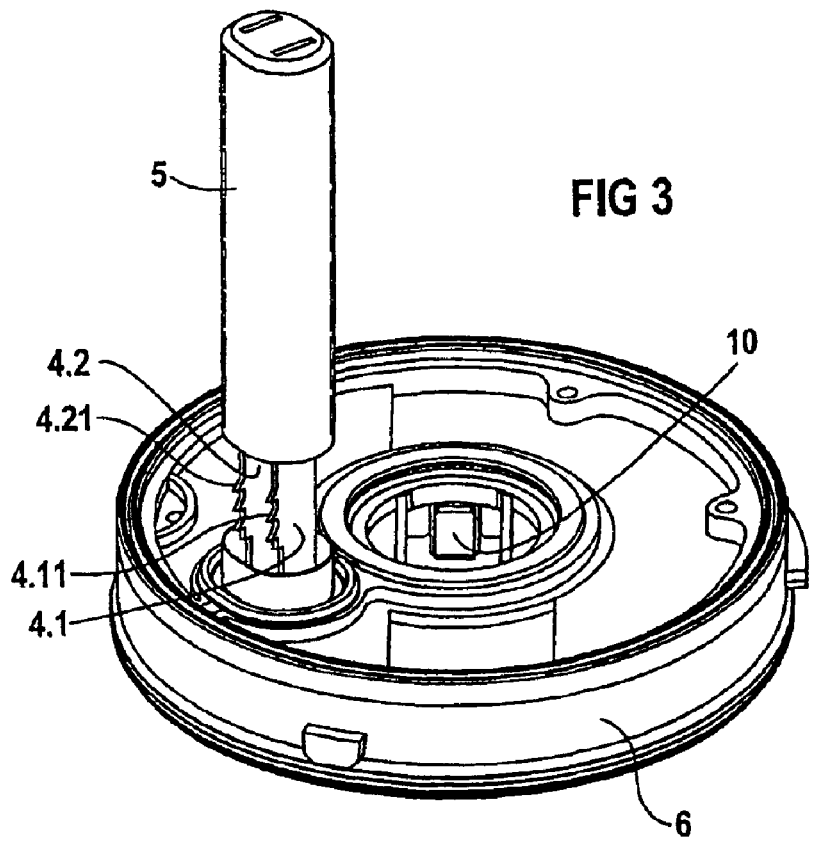
FIG. 3 shows the brush plate on the motor housing side with power supply and control conductors fixed therein and projecting perpendicularly in the form of flat tabs, with an insulating jacket slipped on in part axially, in an assembled position.
Figure 4:
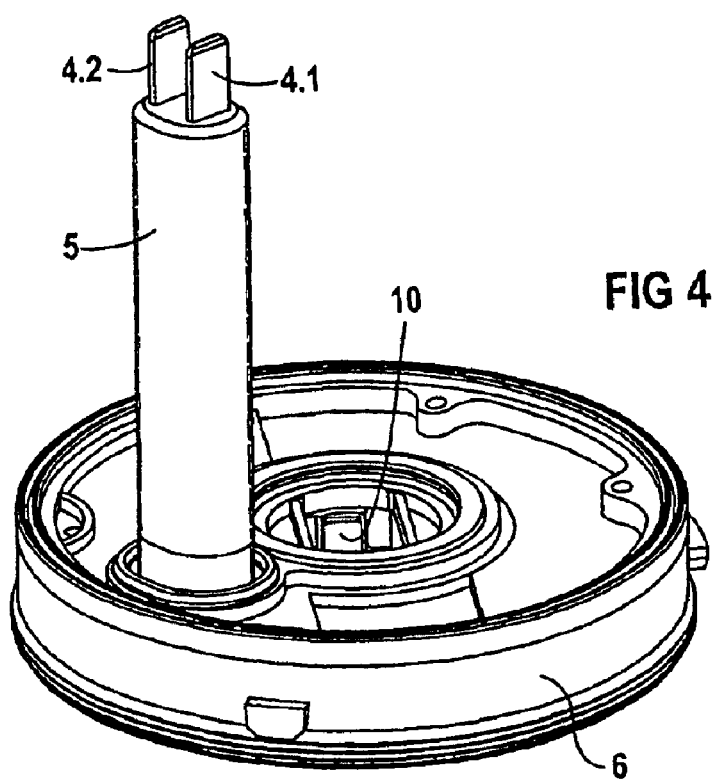
FIG. 4 shows the arrangement according to FIG. 3 with an insulating jacket brought into its locked operating position.
Figure 5:
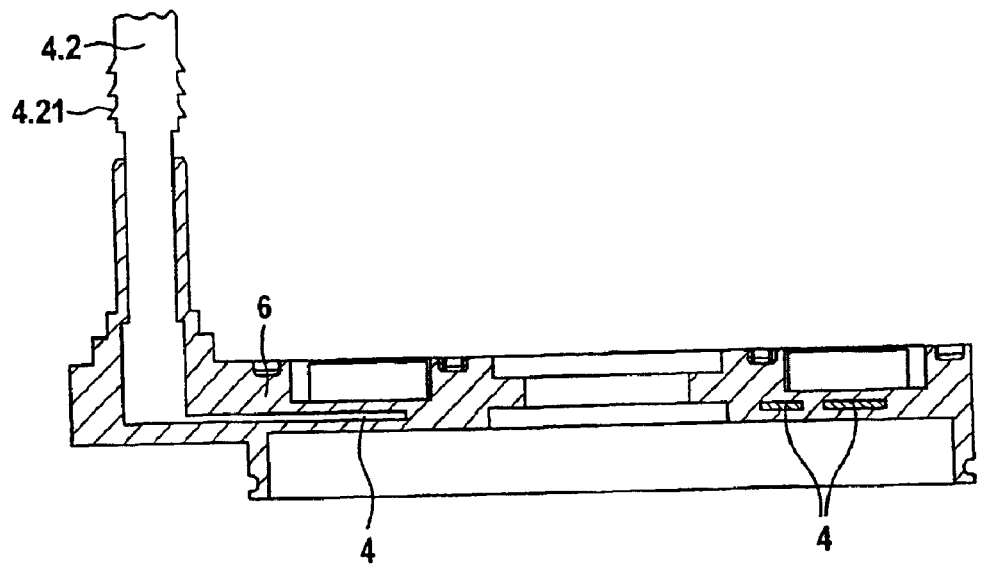
FIG. 5 shows a horizontal section through the brush plate with injected punched grid.

In order to electrically insulate the power supply and control conductors 4.1;4.2, an elastic insulating jacket 5, which can be axially slipped on as per FIG. 3 and fixed by latching in its operating position as per FIG. 4 by a latch 4.11;4.21, is provided such that the ends facing away from the motor housing in the sandwich structure of motor housing 1, pump housing 2 and electronics housing 3, despite a possible mutual displacement of the housing parts to be assembled can deviate in a transversal direction to their axial direction of extension in order to compensate tolerances and a sealed passage through the housing faces can thereby be guaranteed and mechanical stress loadings avoided.

The basic object of the invention can be summarized as follows:

Despite an axial sandwich structure of a motor housing (1), pump housing (2) and electronics housing (3), in a simple production and installation process a plug-in connection comprising power supply and control conductors (4.1;4.2) that is devoid of distortion can be produced between a brush plate (6) in the motor housing (1) and the electronics housing (3) passing though the pump housing (2). To achieve this, the power supply or control conductors (4.1;4.2) are configured as a fixed plug-in connector, with their ends on the motor housing side fixed into the brush plate (5) in the form of a pre-assembled component unit, in particular as a one-piece, bent part of a punched grid (4) that has been injected into said brush plate. Their free plug-in ends on the other hand, which are surrounded by an elastic insulating jacket, can be elastically bent away in a transversal direction to their axial direction of insertion in order to compensate tolerances.

What is claimed is:

1. A motor-pump assembly, for an antilock braking system of a motor vehicle said assembly, comprising a motor housing, a pump housing and an electronics housing in an axial sandwich arrangement in series, wherein at least two plug-in type power supply or control conductors lead, electrically insulated from one another, from the motor housing through the pump housing to the electronics housing;

the plug-in type power supply or control conductors are firmly fixed on the motor housing side in a brush plate, and in other respects freely movable in a transversal direction to the direction of their longitudinal extension at least for the purposes of compensating tolerances;

the plug-in type power supply or control conductors are one-piece bent die-punched parts of a stamped grid held by the brush plate;

a shared elastic insulating jacket is provided for the at least two power supply or control conductors running parallel to one another, the elastic insulating jacket is slipped as a pre-fabricated part on to the plug-in type power supply and control conductors from their free ends facing toward the electronics housing, and the slipped-on insulating jacket is fixed in its ultimate operating position by latches of the plug-in type power supply and control conductors.

2. A motor-pump assembly according to claim 1, wherein the plug-in type power supply or control conductors are fashioned as flat-connector tabs and can be elastically bent away in a transversal direction to the direction of their longitudinal extension in order to compensate tolerances.

3. A motor-pump assembly according to claim 1, wherein the plug-in type power supply or control conductors are, with their free ends facing away from the motor housing, plug-contacted with a printed-circuit board in the electronics housing.

4. A motor-pump assembly according to claim 1, wherein the plug-in type power supply or control conductors in the insulating jacket are, in relation to pump housing, laid on the outside of the housing.

5. A motor-pump assembly according to claim 1, wherein the power supply or control conductors can, when the motor housing pre-equipped with the brush plate is assembled with the pump housing and with the electronics housing, be forcibly contacted with a terminal of said electronics housing.

6. A motor-pump assembly an anti-lock braking system of a motor vehicle, comprising, in an axial sandwich arrangement in series, a motor housing, a pump housing and an electronics housing, wherein:

at least two plug-in type power supply or control conductors lead, electrically insulated from one another, from the motor housing to the electronics housing, the plug-in type power supply or control conductors are firmly fixed on the motor housing side in a brush plate, and in other respects freely movable in a transversal direction to the direction of their longitudinal extension at least for the purposes of compensating tolerances;

the plug-in type power supply or control conductors are one-piece bent die-punched parts of a stamped grid held by the brush plate;

a shared elastic insulating jacket for at least two power supply or control conductors is provided running parallel to one another, the elastic insulating jacket is slipped as a pre-fabricated part on to the plug-in type power supply and control conductors, from their free ends facing toward the electronics housing, and the slipped-on insulating jacket is fixed in its ultimate operating position by latching to the plug-in type power supply and control conductors.

7. A motor-pump assembly according to claim 6, wherein the plug-in type power supply or control conductors are fashioned as flat-connector tabs and can be elastically bent away in a transversal direction to the direction of their longitudinal extension in order to compensate tolerances.

8. A motor-pump assembly according to claim 6, wherein the plug-in type power supply or control conductors can, with their free ends facing away from the motor housing, be plug-contacted, with a printed-circuit board in the electronics housing.

9. A motor-pump assembly according to claim 6, wherein the plug-in type power supply and control conductors in the insulating jacket are, in relation to the pump housing, laid on the outside of the housing.

10. The A motor-pump assembly according to claim 6, wherein the power supply or control conductors can, when the motor housing pre-equipped with the brush plate is assembled with the pump housing and with the electronics housing, be forcibly contacted with a terminal of said electronics housing.

11. A motor-pump assembly comprising:

a motor housing, a pump housing and an electronics housing in an axial sandwich arrangement in series, at least two plug-in type power supply or control conductors leading, electrically insulated from one another, from the motor housing through the pump housing to the electronics housing;

wherein the plug-in type power supply or control conductors are firmly fixed on the motor housing side in a socket and in other respects freely movable in a transversal direction to the direction of their longitudinal extension at least for the purposes of compensating tolerances, and wherein the plug-in type power supply or control conductors are one-piece bent die-punched parts of a stamped grid held by the socket;

a shared elastic insulating jacket for at least two power supply or control conductors, wherein the elastic insulating jacket is arranged to be slipped as a pre-fabricated part on to the plug-in type power supply and control conductors, and the slipped-on insulating jacket is fixed in its ultimate operating position by latching with latches of the plug-in type power supply and control conductors.

12. A motor-pump assembly according to claim 11, wherein the plug-in type power supply or control conductors are fashioned as flat-connector tabs and can be elastically bent away in a transversal direction to the direction of their longitudinal extension in order to compensate tolerances.

13. A motor-pump assembly according to claim 11, wherein the plug-in type power supply or control conductors are, with their free ends facing away from the motor housing, plug-contacted, with a printed-circuit board in the electronics housing.

14. A motor-pump assembly according to claim 11, wherein the plug-in type power supply and control conductors in the insulating jacket are, in relation to the pump housing, laid on the outside of the housing.

15. A motor-pump assembly according to claim 11, wherein the power supply or control conductors can, when the motor housing pre-equipped with the brush plate is assembled with the pump housing and with the electronics housing, be forcibly contacted with a terminal of said electronics housing.

* * * * *

UNITED STATES PATENT AND TRADEMARK OFFICE
CERTIFICATE OF CORRECTION

PATENT NO. : 6,945,756 B2
DATED : September 20, 2005
INVENTOR(S) : Gerd Hartel and Matthias Tupy It is certified that error appears in the above-identified patent and that said Letters Patent is hereby corrected as shown below:

<u>Title page,</u>
Item [75], Inventors, delete "Gerd Hartel, Kuemach (DE)" and replace with -- Gerd Hartel, Kuernach (DE) --.

Signed and Sealed this

Seventeenth Day of January, 2006

JON W. DUDAS
*Director of the United States Patent and Trademark Office*